US012350231B1

(12) United States Patent
Cun et al.

(10) Patent No.: US 12,350,231 B1

(45) Date of Patent: Jul. 8, 2025

(54) MASSAGER

(71) Applicant: Shenzhen Envision Technology Innovation Co., Ltd., Shenzhen (CN)

(72) Inventors: Lang Cun, Shenzhen (CN); Xuefei Cai, Shenzhen (CN); Qing Ma, Shenzhen (CN)

( * ) Notice: Subject to any disclaimer, the term of this patent is extended or adjusted under 35 U.S.C. 154(b) by 0 days.

(21) Appl. No.: 18/764,452

(22) Filed: Jul. 5, 2024

(51) Int. Cl.
*A61H 9/00* (2006.01)
*A61H 19/00* (2006.01)

(52) U.S. Cl.
CPC ......... *A61H 9/0007* (2013.01); *A61H 9/0057* (2013.01); *A61H 9/0078* (2013.01); *A61H 19/32* (2013.01); *A61H 2201/0115* (2013.01); *A61H 2201/1238* (2013.01); *A61H 2201/1409* (2013.01); *A61H 2201/5007* (2013.01)

(58) Field of Classification Search
CPC .. A61H 9/0007; A61H 9/0057; A61H 9/0078; A61H 2201/0115; A61H 2201/1238; A61H 2201/1409; A61H 2201/5007; A61H 19/00; A61H 19/30; A61H 19/32
See application file for complete search history.

(56) References Cited

U.S. PATENT DOCUMENTS

2016/0000643 A1* 1/2016 Makower ............. A61H 9/0007 600/38
2017/0071818 A1* 3/2017 Chen ...................... A61H 19/32
2018/0021212 A1* 1/2018 Matsuura ............. A61H 9/0057 600/38
2020/0046599 A1* 2/2020 Sedic ......................... A61F 5/41
2023/0044372 A1* 2/2023 Liu ....................... A61H 9/0007
2023/0080795 A1* 3/2023 Raju ...................... A61H 9/005 600/38
2023/0372191 A1* 11/2023 Gu ........................ A61H 9/0078
2024/0041692 A1* 2/2024 Zhou ...................... A61H 7/004
2024/0099930 A1* 3/2024 Luo .......................... A61H 7/00

FOREIGN PATENT DOCUMENTS

CN 214858994 U * 11/2021 ........... A61H 9/0078
WO WO-2004004610 A1 * 1/2004 ............... A61F 5/41
WO WO-2013068611 A1 * 5/2013 ............. A61H 19/32
WO WO-2019072718 A1 * 4/2019

* cited by examiner

*Primary Examiner* — Tu A Vo
*Assistant Examiner* — Kelsey E Baller
(74) *Attorney, Agent, or Firm* — Daniel M. Cohn; Howard M. Cohn

(57) ABSTRACT

The present disclosure provides massager, comprising: a shell, an inner sleeve assembled in the shell, and a vibration mechanism for driving the inner sleeve to massage and stimulate a massaged area, wherein: the inner sleeve is made of elastic material and a gap space is reserved between the inner sleeve and the shell; the massager also comprises a sucking mechanism, which is activated to pump or inflate air to form a pressure difference between the massage cavity inside the inner sleeve and the gap space; the inner sleeve expands or contracts accordingly under the influence of the pressure difference and recovers accordingly after the sucking mechanism stops pumping or inflating, thereby forming a sucking cycle.

9 Claims, 6 Drawing Sheets

MASSAGER

TECHNICAL FIELD

The present disclosure relates to a technical field of massage devices, and in particular to a massager.

BACKGROUND

An existing massager is provided with a corresponding massage cavity, and a users can place a massaged area in the massage cavity for a wrapping massage. The above-mentioned massager generally comprises a shell, an inner sleeve assembled in the shell, and a vibration mechanism for driving the inner sleeve to massage and stimulate the massaged area. An opening connected to the internal massage cavity is formed at one end of the inner sleeve. In actual use, the users place the massaged area through the opening into the massage cavity and starts the vibration mechanism. The inner sleeve is attached to the massaged area for vibration tapping to achieve the effect of acupoint stimulation, the massage effect is single and insufficient to meet user's need.

SUMMARY

The present disclosure provides a massager, and solves the problem to simulate the massage effect of sucking and squeezing on the massaged area placed in the massage cavity, so as to improve the user's experience.

In order to realize the above purpose, the present disclosure provides a massager, comprising: a shell, an inner sleeve assembled in the shell, and a vibration mechanism for driving the inner sleeve to massage and stimulate a massaged area, wherein: the inner sleeve is made of elastic material and a gap space is reserved between the inner sleeve and the shell; the massager also comprises a sucking mechanism, which is activated to pump or inflate air to form a pressure difference between the massage cavity inside the inner sleeve and the gap space; the inner sleeve expands or contracts accordingly under the influence of the pressure difference and recovers accordingly after the sucking mechanism stops pumping or inflating, thereby forming a sucking cycle.

Furthermore, the sucking mechanism comprises a water air pump, as well as an air inlet pipeline and an air outlet pipeline respectively corresponding to the air inlet and the air outlet of the water air pump, one of the air inlet pipeline and the air outlet pipeline is connected to the outer space of the shell and thus to the atmosphere, and the other one is connected to the massage cavity or the gap space.

Furthermore, the air inlet pipeline is connected to the gap space and the air outlet pipeline is connected to the outer space of the shell.

Furthermore, the air outlet of the water air pump is also connected to a buffer tank, which comprises an input end and two output ends, the air outlet pipeline comprises a transfer pipeline connected to the input end of the buffer tank, and a first air outlet pipeline and a second air outlet pipeline respectively connected to the outer space of the shell and the gap space.

Furthermore, the sucking mechanism further comprises an electromagnetic valve connected in series to the second air outlet pipeline, the electromagnetic valve is opened to connect the gap space with the outer space of the shell, and the electromagnetic valve is closed to cut off the air outlet and the gap space.

Furthermore, the shell comprises a top shell, an adapter ring and a main shell, and the sucking mechanism is assembled on an end surface of the adapter ring, the top shell correspondingly covers the sucking mechanism, the end of the top shell is sealed with the adapter ring, the main shell is assembled on a side of the adapter ring away from the sucking mechanism and is sealed with the adapter ring; the inner sleeve is correspondingly arranged in the main shell.

Furthermore, the joints of the adapter ring with the top shell and the main shell are each filled with a sealing layer, which enables the connection to be sealed, and a waterproof ring is assembled at the end of the inner sleeve to seal the gap space.

Furthermore, the sucking mechanism comprises the water air pump, a control circuit board connected to the water air pump, and a control switch exposed on the top shell, the top shell is provided with an operation window corresponding to the control switch, and the control switch is fixedly connected to the operation window by filling a sealing glue layer between them.

Furthermore, the outer side wall of the adapter ring is provided with a plurality of clamping grooves, and the main shell is provided with a clamping block corresponding to the clamping grooves; one end of the clamping groove extends out of a guide groove, the main shell is aligned with the notch of the guide groove by the clamping block and moved to its bottom end, then rotated in a circumferential direction to clamp into the clamping groove and fixedly connect with the adapter ring.

Furthermore, the vibration mechanism comprises a top end that is fitted to the inner sleeve.

After adopting the above technical solutions, the massager provided by the present disclosure has beneficial effects as follows:

In the embodiment of the present invention, by setting the sucking mechanism, the sucking mechanism is activated to pump or inflate air to form a pressure difference between the massage cavity inside the inner sleeve and the gap space; when the pressure difference is positive, the inner sleeve will expand accordingly; when the pressure difference is negative, the inner sleeve will contract accordingly. After the sucking mechanism is closed, the inner sleeve is restored to its initial state accordingly. By controlling the start and close of the sucking mechanism, the periodic expansion and contraction or contraction and expansion of the inner sleeve can be achieved, simulating the massage effect of sucking and squeezing, thereby improving the user's experience.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
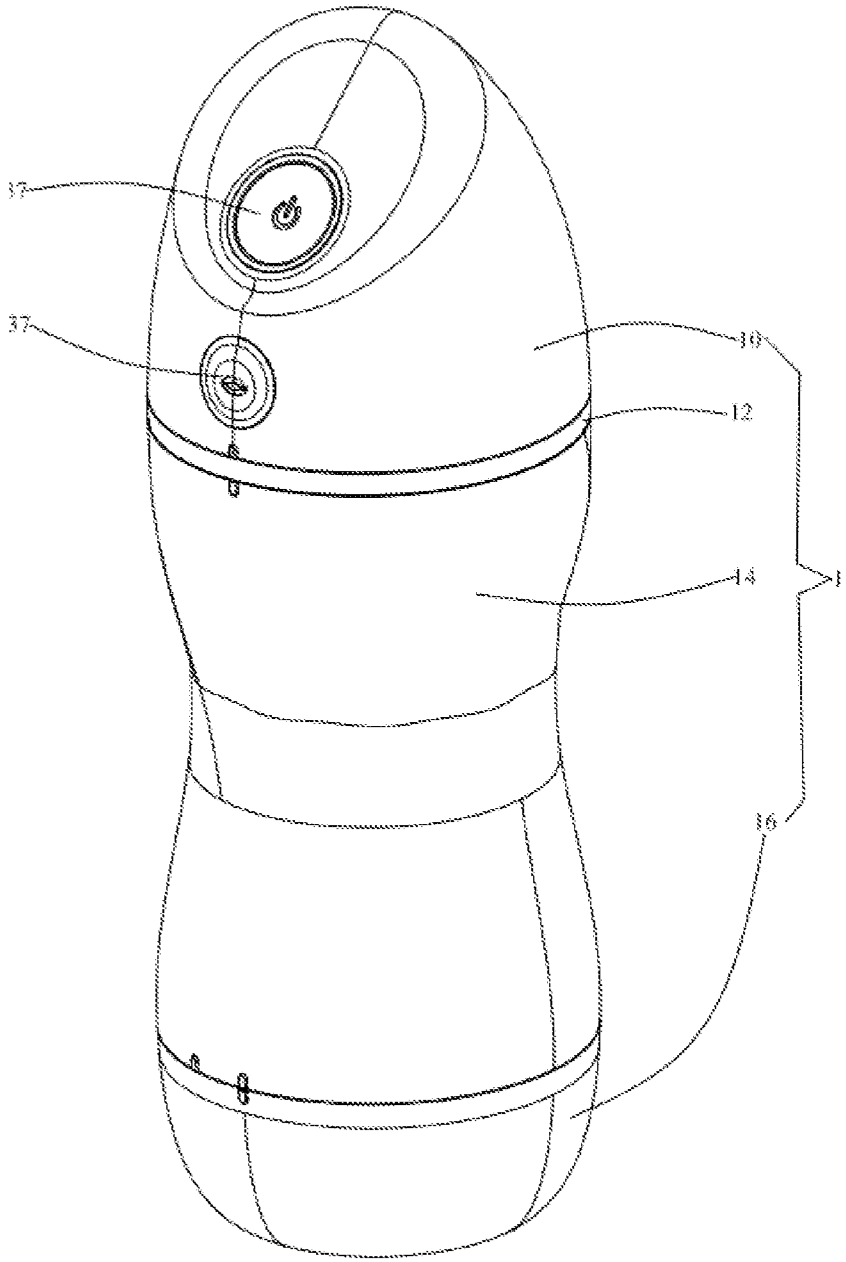
FIG. 1 is a schematic diagram of the overall structure of one embodiment of a massager provided by the present disclosure.

Reference number in the drawings:

| | | | |
|---|---|---|---|
| shell | 1 | inner sleeve | 2 |
| sucking mechanism | 3 | waterproof ring | 4 |
| sealing glue layer | 5 | vibration mechanism | 6 |
| gap space | A | top shell | 10 |
| adapter ring | 12 | main shell | 14 |
| dust cover | 16 | massage cavity | 20 |
| mounting groove | 21 | water air pump | 30 |
| air inlet pipeline | 32 | air outlet pipeline | 34 |
| control circuit board | 35 | buffer tank | 36 |
| control switch | 37 | electromagnetic valve | 38 |
| waterproof baffle | 41 | sealing ring | 43 |
| operation window | 101 | sealing layer | 121 |
| annular groove | 123 | vent hole | 125 |
| clamping groove | 127 | guide groove | 129 |
| clamping block | 143 | retaining protrusion | 1270 |
| retaining groove | 1430 | air inlet | 301 |
| air outlet | 303 | transfer pipeline | 341 |
| first air outlet pipeline | 343 | second air outlet pipeline | 345 |
| input end | 361 | output end | 363 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 6, the present disclosure provides a massager, comprising: a shell 1, an inner sleeve 2 assembled in the shell 1, and a vibration mechanism 6 for driving the inner sleeve 2 to massage and stimulate a massaged area, wherein: the inner sleeve 2 is made of elastic material and a gap space A is reserved between the inner sleeve 2 and the shell 1; the massager also comprises a sucking mechanism 3, which is activated to pump or inflate air to form a pressure difference between the massage cavity 20 inside the inner sleeve 2 and the gap space A; the inner sleeve 2 expands or contracts accordingly under the influence of the pressure difference and recovers accordingly after the sucking mechanism 3 stops pumping or inflating, thereby forming a sucking cycle.

By setting the sucking mechanism 3, the sucking mechanism 3 is activated to pump or inflate air to form a pressure difference between the massage cavity 20 inside the inner sleeve 2 and the gap space A; when the pressure difference is positive, the inner sleeve 2 will expand accordingly; when the pressure difference is negative, the inner sleeve 2 will contract accordingly. After the sucking mechanism 3 is closed, the inner sleeve 2 is restored to its initial state accordingly. By controlling the start and close of the sucking mechanism 3, the periodic expansion and contraction or contraction and expansion of the inner sleeve 2 can be achieved, simulating the massage effect of sucking and squeezing, thereby improving the user's experience. During the specific implementation process, a plurality of massage protrusions 23 are further arranged inside the inner sleeve 2 to enhance the massage stimulation; the sucking mechanism 3 can contract or expand the inner sleeve 2 by pumping or inflating the massage cavity 20; or expand or contract the inner sleeve 2 by pumping or inflating the gap space A.

In one embodiment, referring to FIG. 2 and FIGS. 4-6, the sucking mechanism 3 comprises a water air pump 30, as well as an air inlet pipeline 32 and an air outlet pipeline 34 respectively corresponding to the air inlet 301 and the air outlet 303 of the water air pump 30, one of the air inlet pipeline 32 and the air outlet pipeline 34 is connected to the outer space of the shell 1 and thus to the atmosphere, and the other one is connected to the massage cavity 20 or the gap space A. In this embodiment, the sucking mechanism 3 comprises a water air pump 30, as well as an air inlet pipeline 32 and an air outlet pipeline 34 respectively corresponding to the air inlet 301 and the air outlet 303 of the water air pump 30, one of the air inlet pipeline 32 and the air outlet pipeline 34 is connected to the massage cavity 20 or the gap space A to perform air extraction or inflation, so as to drive the inner sleeve 2 to perform corresponding expansion or contraction deformation; the other one is connected to the atmosphere, so that after stopping the evacuation or inflation, the air pressure in the massage cavity 20 or the gap space A can be quickly balanced through the atmosphere to drive the inner sleeve 2 to recover, thereby increasing the frequency of the sucking massage.

In another embodiment, referring to FIG. 2 and FIGS. 4-6, the air inlet pipeline 32 is connected to the gap space A and the air outlet pipeline 34 is connected to the outer space of the shell 1. In this embodiment, the air inlet pipeline 32 is connected to the gap space A and the air outlet pipeline 34 is connected to the outer space of the shell 1. The water air pump 30 draws the air in the gap space A to the outer space of the shell 1 to form a negative pressure, and the inner sleeve 2 expands accordingly. After the water air pump 30 is turned off, the inner sleeve 2 recovers and contracts accordingly, forming a sucking massage. There is no need for the inner sleeve 2 to be connected to the sucking mechanism 3 through an air path, the structure has strong independence, and it is more convenient to clean and replace.

Figure 4:
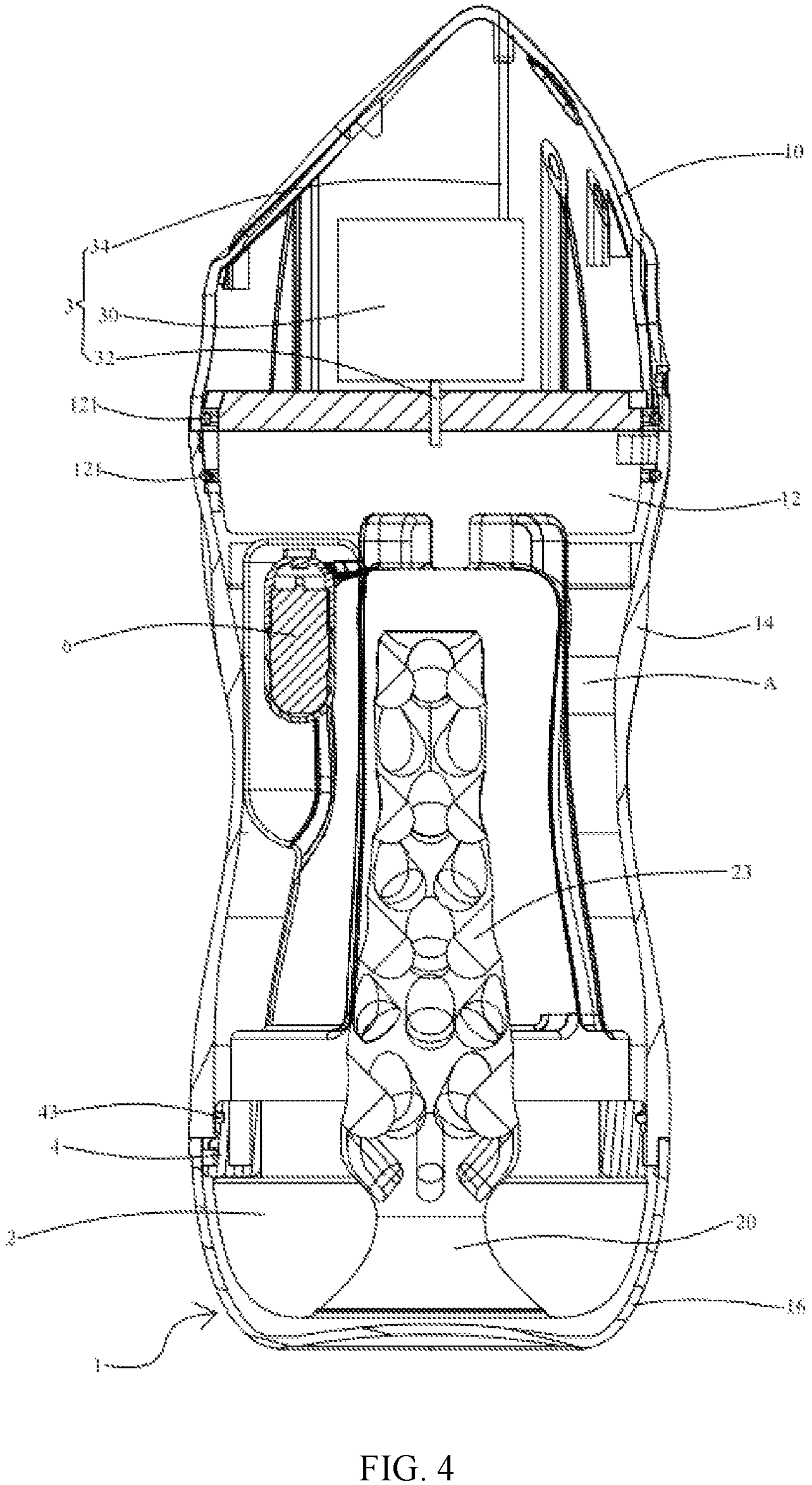
FIG. 4 is schematic cross-sectional view according to one embodiment of the massager, taken along the central axis of the main shell.
Figure 5:
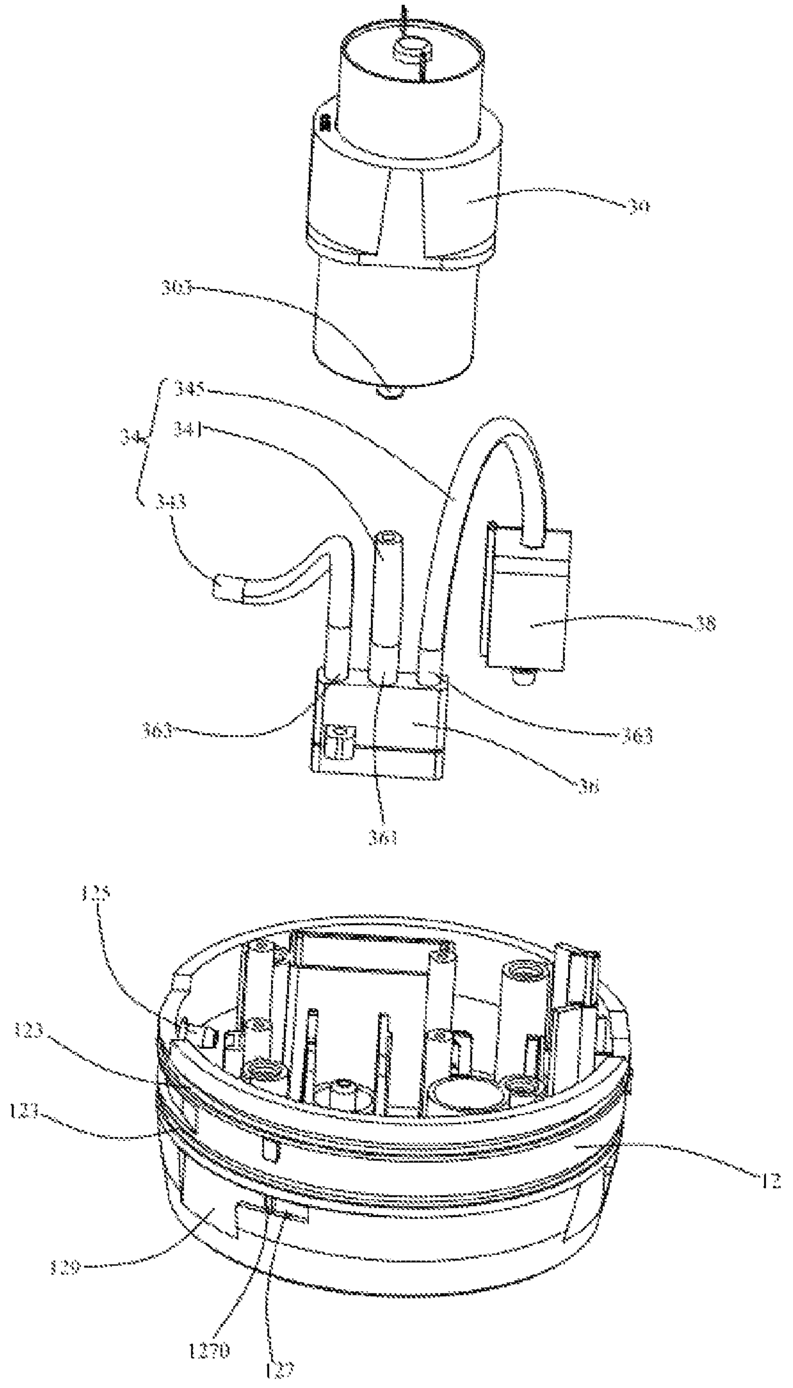
FIG. 5 is a schematic diagram of the structure of the water air pump and the adapter ring in a disassembled state according to one embodiment of the massager.
Figure 6:
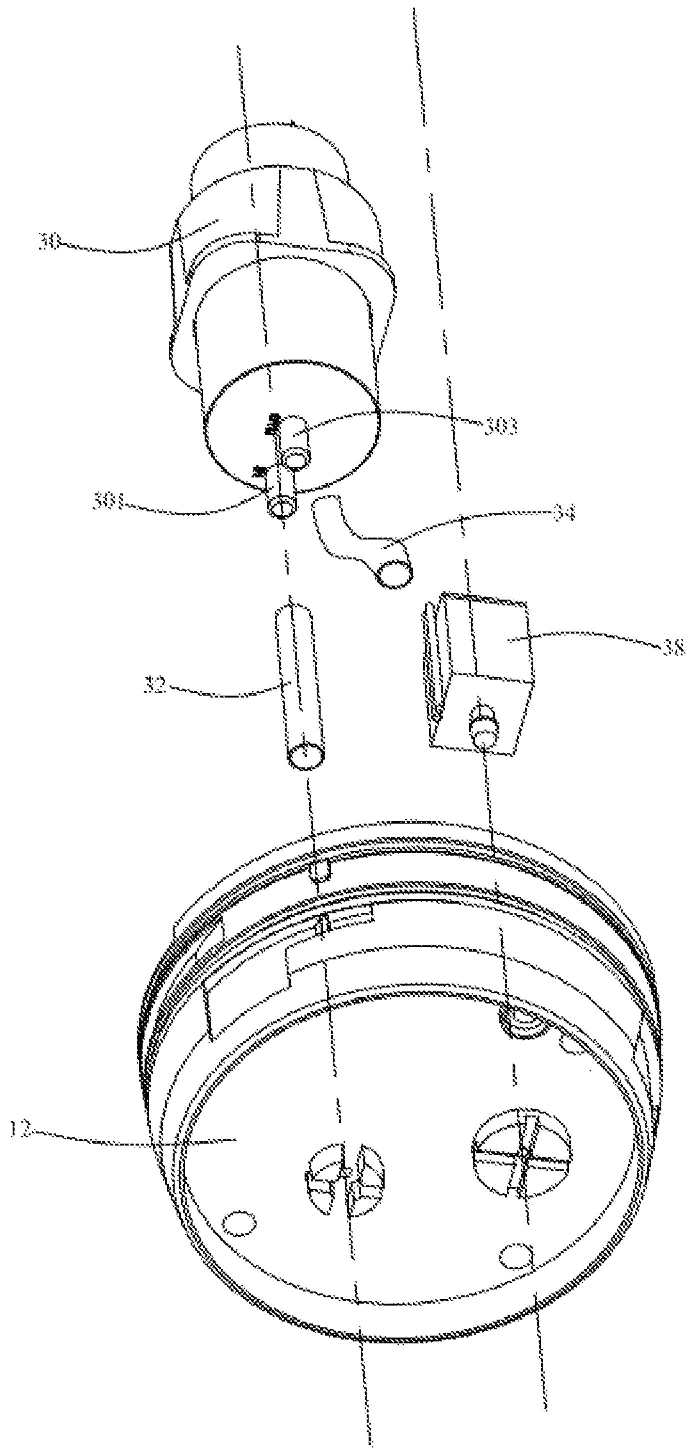
FIG. 6 is a schematic diagram of the structure of the water air pump and the adapter ring in a disassembled state according to one embodiment of the massager.

In another embodiment, referring to FIG. 2 and FIGS. 4-6, the air outlet 303 of the water air pump 30 is also connected to a buffer tank 36, which comprises an input end 361 and two output ends 363, the air outlet pipeline 34 comprises a transfer pipeline 341 connected to the input end 361 of the buffer tank 36, and a first air outlet pipeline 343 and a second air outlet pipeline 345 respectively connected to the outer space of the shell 1 and the gap space A. In this embodiment, the buffer tank 36 is connected to the air outlet 303 of the water air pump 30 to improve the stability of the entire air path; the input end 361 of the buffer tank 36 is connected to the air outlet 303, and the two output ends 363 are respectively connected to the outer space of the shell 1 and the gap space A, so as to facilitate the alternate formation of suction and inflation effects in the gap space A by controlling the on and off of the air path, the inner sleeve 2 expands and contracts accordingly, and ultimately achieves a massage effect that simulates sucking. In the specific implementation process, when the first air outlet pipeline 343 is connected and the second air outlet pipeline 345 is closed, the water air pump 30 draws air outward, the negative pressure is generated in the gap space A, and the inner sleeve 2 expands accordingly. When the first air outlet pipeline 343 and the second air outlet pipeline 345 are connected at the same time, the gap space A is connected to the atmosphere outside the shell 1, the negative pressure in the gap space A is balanced to the atmospheric pressure, and the inner sleeve 2 contracts accordingly, thereby forming a sucking cycle; as shown in FIG. 5, the adapter ring 12 is provided with a vent hole 125 connected to the outside atmosphere, the first air outlet pipeline 343 is connected to the air vent 125 and thus to the atmosphere outside the shell 1.

In another embodiment, referring to FIG. 2 and FIGS. 4-6, the sucking mechanism 3 further comprises an electromagnetic valve 38 connected in series to the second air outlet pipeline 345, the electromagnetic valve 38 is opened to connect the gap space A with the outer space of the shell 2, and the electromagnetic valve 38 is closed to cut off the air outlet 303 and the gap space A. In this embodiment, the electromagnetic valve 38 is connected in series to the second air outlet pipeline 345, and the start and stop of the electromagnetic valve 38 controls the air extraction and air filling in the gap space A, so as to realize automatic control and adjustment of the sucking cycle.

In another embodiment, referring to FIGS. 1-4, the shell 1 comprises a top shell 10, an adapter ring 12 and a main shell 14, and the sucking mechanism 3 is assembled on an end surface of the adapter ring 12, the top shell 10 correspondingly covers the sucking mechanism 3 and the end of the top shell is sealed with the adapter ring 12, the main shell 14 is assembled on a side of the adapter ring 12 away from the sucking mechanism 3 and is sealed with the adapter ring 12; the inner sleeve 2 is correspondingly arranged in the main shell 14. In this embodiment, the shell 1 comprises the top shell 10, the adapter ring 12 and the main shell 14. One end surface of the adapter ring 12 is used to assemble the sucking mechanism 3, and the sucking mechanism 3 is sealed by the corresponding top shell 10. The other end of the adapter ring 12 relative to the sucking mechanism 3 is connected to the main shell 14, and the main shell 14 is sealed with to the adapter ring 12, so that the sucking mechanism 3 can be easily disassembled, assembled and repaired separately. In the specific implementation process, as shown in FIG. 1, a corresponding dust cover 16 is also provided at the outer end of the inner sleeve 2. When the massager is not in use, the dust cover 16 is connected to the end of the main shell 14 away from the top shell 10 to cover the inner sleeve 2.

In another embodiment, referring to FIGS. 1-4, the joints of the adapter ring 12 with the top shell 10 and the main shell 14 are each filled with a sealing layer 121, which enables the connection to be sealed, and a waterproof ring 4 is assembled at the end of the inner sleeve 2 to seal the gap space A. In this embodiment, the sealing layer 121 is filled at the joints between the connecting ring and the top shell 10, as well as the connecting ring and the main shell 14 to achieve the sealing performance of the shell 1. Also, the waterproof ring 4 is provided between the end of the inner sleeve 2 and the inner wall of the main shell 14. One seal makes the whole machine waterproof, with a simple structure, making the whole massager waterproof and convenient for users to deep clean. In the specific implementation process, the sealing layer 121 can be an elastic rubber ring filled in the connection, a sealing glue layer or a hot-melt material layer. In order to position the sealing layer 121, a corresponding annular groove 123 can be further provided on the top shell 10, the main shell 14 or the adapter ring 12 to facilitate the filling operation of the sealing layer 121; the inner sleeve 2 is provided with a mounting groove 21, and the waterproof ring 4 is correspondingly sleeved in the mounting groove 21 to relatively fixed in the axial direction. The waterproof ring 4 is provided with a plurality of circles of waterproof baffles 41 in parallel along the axial direction, and the waterproof baffles 41 at the ends are correspondingly fitted to the ends of the main shell 14 to block the gap space A. An elastic waterproof sealing ring 43 can be also provided between the waterproof baffles 41 to further enhance the sealing effect.

Figure 2:
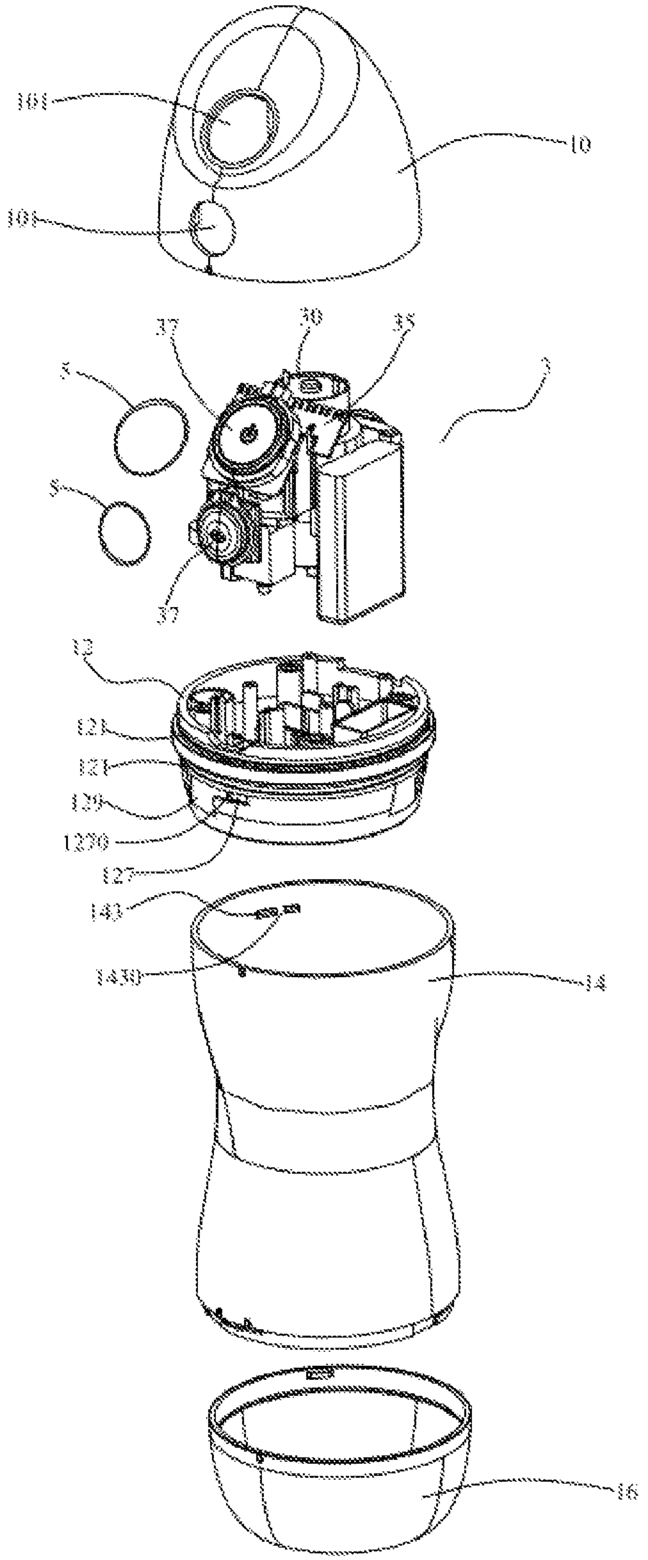
FIG. 2 is a schematic diagram of the structure of the shell and the sucking mechanism in a disassembled state according to one embodiment of the massager.

In another embodiment, referring to FIG. 2, the sucking mechanism 3 comprises the water air pump 30, a control circuit board 35 connected to the water air pump 30, and a control switch 37 exposed on the top shell 10, the top shell 10 is provided with an operation window 101 corresponding to the control switch 37, and the control switch 37 is fixedly connected to the operation window 101 by filling a sealing glue layer 5 between them. In this embodiment, the sealing glue layer 5 is formed by applying corresponding glue on the periphery of the control switch 37 and the operating window 101 of the top shell 10, the control switch 37 and the top shell 10 are relatively fixed and sealed at the same time, thereby achieving waterproofness of the entire massager.

In another embodiment, referring to FIG. 2 and FIG. 5, the outer side wall of the adapter ring 12 is provided with a plurality of clamping grooves 127, and the main shell 14 is provided with a clamping block 143 corresponding to the clamping grooves 127; one end of the clamping groove 127 extends out of a guide groove 129, the main shell 14 is aligned with the notch of the guide groove 129 by the clamping block 143 and moved to its bottom end, then rotated in a circumferential direction to clamp into the clamping groove 127 and fixedly connect with the adapter ring 12. In this embodiment, the guide groove 129 is provided to facilitate positioning of the clamping block 143, and then the clamping block 143 is positioned and installed in the clamping groove 127 by circumferential screwing, so that the assembly operation is simple and convenient. In the specific implementation process, as shown in FIG. 2, a corresponding retaining protrusion 1270 can also be provided in the clamping groove 1270, the clamping block 143 is provided with a retaining groove 1430 corresponding to the stop protrusion 1270. When the clamping block 143 is rotated into the clamping groove 127, the retaining protrusion 1270 is also correspondingly engaged in the retaining groove 1430, further enhancing the stability of the connection between the main shell 14 and the adapter ring 12.

Figure 3:
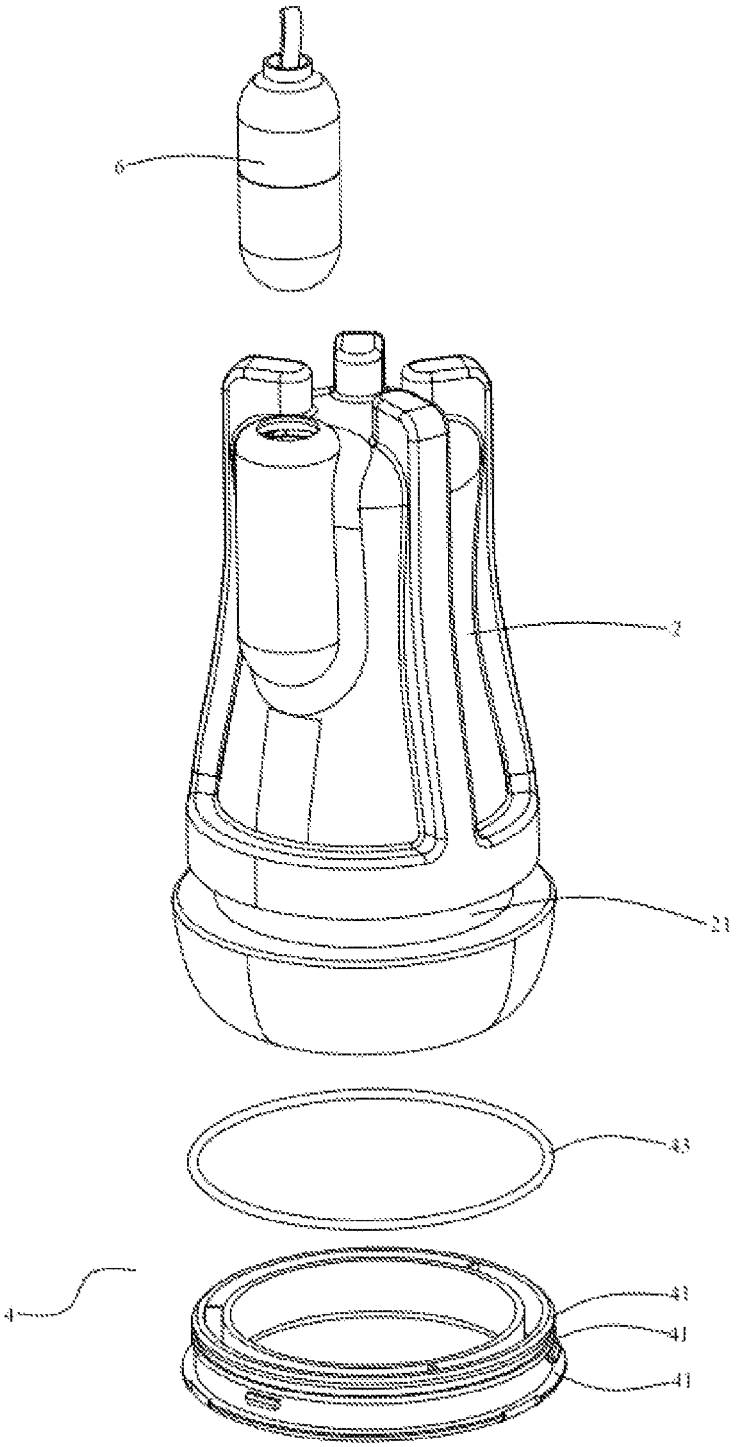
FIG. 3 is aa schematic diagram of the structure of the inner sleeve and the waterproof ring in a disassembled state according to one embodiment of the massager.

In another embodiment, referring to FIG. 3 and FIG. 4, the vibration mechanism 6 comprises a top end that is fitted to the inner sleeve 2. In this embodiment, the vibration mechanism 6 is provided at the top end of the inner sleeve 2 to enhance the vibration sensation of the massaged area in the inner sleeve 2, thereby enhancing the effect of the vibration and tapping massage and meeting the massage stimulation needs of more users.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A massager, comprising: a shell, an inner sleeve assembled in the shell, and a vibration mechanism for driving the inner sleeve to massage and stimulate a massaged area, wherein:

the inner sleeve is made of elastic material and a gap space is reserved between the inner sleeve and the shell; the massager also comprises a sucking mechanism, which is activated to pump or inflate air to form a pressure difference between a massage cavity inside the inner sleeve and the gap space; the inner sleeve expands or contracts accordingly under the influence of the pressure difference and recovers accordingly after the sucking mechanism stops pumping or inflating, thereby forming a sucking cycle;

wherein the sucking mechanism comprises a water air pump; the water air pump comprises an air inlet and an air outlet; a buffer tank is arranged and is connected to the air outlet of the water air pump;

the buffer tank comprises one input end and two output ends; the one input end is connected to a transfer pipeline to be connected to the air outlet of the water air pump; one of the two output ends is connected to a first air outlet pipeline to be connected to an outer space of the shell; the other one of the two output ends is connected to a second air outlet pipeline to be connected to the gap space;

when the first air outlet pipeline is fluidly conducted and the second air outlet pipeline is closed, the water air pump draws air from the gap space to the outer space of the shell, a negative pressure is generated in the gap space, and the inner sleeve is expanded; and when the first air outlet pipeline and the second air outlet pipeline are fluidly conducted simultaneously, the negative pressure in the gap space is balanced to an atmospheric pressure, and the inner sleeve is contracted.

2. The massager of claim 1, wherein the sucking mechanism further comprises an air inlet pipeline corresponding to the air inlet of the water air pump, the air outlet pipeline is connected to the outer space of the shell and thus to the atmosphere.

3. The massager of claim 2, wherein the air inlet pipeline is connected to the gap space.

4. The massager of claim 1, wherein the sucking mechanism further comprises an electromagnetic valve connected in series to the second air outlet pipeline, the electromagnetic valve is opened to connect the gap space with the outer space of the shell, and the electromagnetic valve is closed to cut off the air outlet and the gap space.

5. The massager of claim 1, wherein the shell comprises a top shell, an adapter ring and a main shell, and the sucking mechanism is assembled on an end surface of the adapter ring, the top shell correspondingly covers the sucking mechanism and an end of the top shell is sealed with the adapter ring, the main shell is assembled on a side of the adapter ring away from the sucking mechanism and is sealed with the adapter ring, the inner sleeve is correspondingly arranged in the main shell.

6. The massager of claim 5, wherein joints of the adapter ring with the top shell and the main shell are each filled with a sealing layer, which enables the connection to be sealed, and a waterproof ring is assembled at an end of the inner sleeve to seal the gap space.

7. The massager of claim 5, wherein the sucking mechanism comprises the water air pump, a control circuit board connected to the water air pump, and a control switch exposed on the top shell, the top shell is provided with an operation window corresponding to the control switch, and the control switch is fixedly connected to the operation window by filling a sealing glue layer between the control switch and the operation window.

8. The massager of claim 5, wherein an outer side wall of the adapter ring is provided with a plurality of clamping grooves, and the main shell is provided with a clamping block corresponding to the clamping grooves; one end of the clamping groove extends out of a guide groove, the main shell is aligned with a notch of the guide groove by the clamping block and moved to a bottom end of the guide groove, then rotated in a circumferential direction to clamp into the clamping groove and fixedly connect with the adapter ring.

9. The massager of claim 1, wherein the vibration mechanism comprises a top end that is fitted to the inner sleeve.

* * * * *